(12) United States Patent
Yoshimura et al.

(10) Patent No.: US 11,805,513 B2
(45) Date of Patent: *Oct. 31, 2023

(54) TERMINAL DEVICE, COMMUNICATION METHOD, AND COMMUNICATION SYSTEM

(71) Applicant: SHARP KABUSHIKI KAISHA, Sakai (JP)

(72) Inventors: Tomoki Yoshimura, Sakai (JP); Hiromichi Tomeba, Sakai (JP); Yasuhiro Hamaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 146 days.

This patent is subject to a terminal disclaimer.

(21) Appl. No.: 17/219,380

(22) Filed: Mar. 31, 2021

(65) Prior Publication Data

US 2021/0250969 A1 Aug. 12, 2021

Related U.S. Application Data

(63) Continuation of application No. 16/674,605, filed on Nov. 5, 2019, now Pat. No. 10,973,042, which is a (Continued)

(30) Foreign Application Priority Data

Apr. 28, 2015 (JP) ................................. 2015-090910

(51) Int. Cl.
*H04W 72/1268* (2023.01)
*H04W 16/28* (2009.01)
(Continued)

(52) U.S. Cl.
CPC ...... *H04W 72/1268* (2013.01); *H04B 7/0452* (2013.01); *H04W 16/28* (2013.01);
(Continued)

(58) Field of Classification Search
CPC ......... H04W 72/1268; H04W 72/0413; H04W 72/0446; H04W 72/0473; H04W 72/1284;
(Continued)

(56) References Cited

U.S. PATENT DOCUMENTS 9,392,561 B2 7/2016 Kang et al.
10,334,007 B2 * 6/2019 Chun .................. H04L 27/2602
(Continued)

FOREIGN PATENT DOCUMENTS

| JP | 2013-501441 A | 1/2013 |
| JP | 2013-255143 A | 12/2013 |
| JP | 2015-511098 A | 4/2015 |

OTHER PUBLICATIONS

Yongho Seok et al. Uplink Multi-User MIMO Protocol Design, IEEE 802.11-15/0331r0, Mar. 8, 2015.
(Continued)

*Primary Examiner* — Peter G Solinsky
(74) *Attorney, Agent, or Firm* — ScienBiziP, P.C.

(57) ABSTRACT

A method that carries out uplink multiple access while reducing complexity in processing accompanying exchange of control information. A terminal device that performs uplink multiple access communication includes a reception unit that receives a frame including uplink multiple access connection information, a first autonomous decentralized control unit that instructs securing time of a wireless resource, and a second autonomous decentralized control unit that instructs securing time of a wireless resource after reception of a frame including the uplink multiple access connection information. The terminal device is instructed securing time of the wireless resource by the first autonomous decentralized control unit in a case that a frame including the uplink multiple access connection information is not received. Securing time of the wireless resource is instructed by the second autonomous decentralized control
(Continued)

unit in a case that a frame including the uplink multiple access connection information is received.

3 Claims, 8 Drawing Sheets

Related U.S. Application Data continuation of application No. 15/570,098, filed as application No. PCT/JP2016/062875 on Apr. 25, 2016, now Pat. No. 10,492,215.

(51) Int. Cl.
*H04W 74/08* (2009.01)
*H04W 52/50* (2009.01)
*H04W 52/14* (2009.01)
*H04W 72/21* (2023.01)
*H04B 7/0452* (2017.01)
*H04W 72/0446* (2023.01)
*H04W 72/044* (2023.01)
*H04W 84/12* (2009.01)

(52) U.S. Cl.
CPC ......... *H04W 52/146* (2013.01); *H04W 52/50* (2013.01); *H04W 72/0446* (2013.01); *H04W 72/0473* (2013.01); *H04W 72/21* (2023.01); *H04W 74/0808* (2013.01); *H04W 84/12* (2013.01)

(58) Field of Classification Search
CPC ... H04W 16/28; H04W 52/146; H04W 52/50; H04W 84/12; H04W 74/0808; H04B 7/0452
USPC ......................................................... 370/329
See application file for complete search history.

(56) References Cited

U.S. PATENT DOCUMENTS

| | | | |
|---|---|---|---|
| 10,492,215 B2* | 11/2019 | Yoshimura | H04W 72/0446 |
| 10,973,042 B2* | 4/2021 | Yoshimura | H04W 72/0413 |
| 2015/0085836 A1 | 3/2015 | Kang et al. | |
| 2015/0139106 A1 | 5/2015 | Masuda et al. | |
| 2016/0007247 A1 | 1/2016 | Lee et al. | |
| 2016/0337012 A1 | 11/2016 | Kimura et al. | |
| 2017/0041971 A1 | 2/2017 | Kim et al. | |
| 2017/0171886 A1 | 6/2017 | Nabetani et al. | |

OTHER PUBLICATIONS

Non-Final Rejection of U.S. Appl. No. 15/570,098 dated Mar. 7, 2019.
Non-Final Rejection of U.S. Appl. No. 16/674,605 dated May 13, 2020.

\* cited by examiner

FIG. 8

| Group ID | STATIONS INCLUDED |
|---|---|
| 0 | UNUSED |
| 1 | STA2, STA3, STA4, STA5 |
| 2 | STA3, STA2, STA4, STA5 |
| ⋮ | ⋮ |
| 31 | STA6, STA2, STA4, STA8 |
| 32 | STA7, STA8, STA4, STA6 |
| 33 | STA2, STA3, STA8, STA5 |
| ⋮ | ⋮ |
| 62 | STA4, STA5, STA6, STA7 |
| 63 | UNUSED |

TERMINAL DEVICE, COMMUNICATION METHOD, AND COMMUNICATION SYSTEM

The present application is a continuation application of U.S. patent application Ser. No. 16/674,605, filed on Nov. 5, 2019, which is a continuation application of U.S. patent application Ser. No. 15/570,098, filed on Oct. 27, 2017, which is the U.S. National Phase of International Application No. PCT/JP2016/062875 filed on Apr. 25, 2016, which designated the U.S. and claims priority to Japanese Patent Application No. 2015-090910 filed in Japan on Apr. 28, 2015. The entire disclosure of such parent application is incorporated herein by reference.

TECHNICAL FIELD

The present invention relates to a terminal device, a communication method, and a communication system.

BACKGROUND ART

The IEEE (The Institute of Electrical and Electronics Engineers Inc.) has set forth IEEE 802.11ac, which realizes even higher speeds than IEEE 802.11 that is a wireless LAN (Local Area Network) standard. The IEEE currently has started work on standardization of IEEE 802.11ax as a successor standard for IEEE 802.11ac. Improved throughput per user in an environment where wireless LAN devices are overcrowded is being studied in standardization of IEEE 802.11ax as well, to handle the rapid increase of wireless LAN devices.

A wireless LAN system is a system where each wireless LAN device secures its own resources in an autonomous decentralized manner (autonomous decentralized system). An autonomous decentralized system is a system in which temporal synchronization among wireless LAN devices, and exchange of complicated control information, are not required. Accordingly, a wireless network can be configured using wireless LAN devices that have a relatively simple configuration. Autonomous decentralized systems are well-suited for unlicensed band, due to the ease of configuring wireless networks.

Usage situations of wireless LAN systems have become markedly diversified due to the rapid spread thereof in recent years. For example, situations such as a wireless carrier using a wireless LAN system for offloading wireless mobile communication traffic, providing public wireless LANs primarily targeting foreign tourists, and so forth, have already been realized, with wireless LAN base stations (AP: Access Point) being installed in train stations, large-scale commercial facilities, and so forth. Thus, wireless LANs have been actively installed in locations where people congregate, with Internet services being actively provided.

The standardization of IEEE 802.11ax aims to improve throughput in environments where wireless LAN devices are overcrowded, viewed against the background of diversity in usage situations of wireless LAN, and technology for introduction thereof is being studied.

One technology being studied for standardization of IEEE 802.11ax is uplink multiple access technology. Uplink multiple access technology is technology where multiple LAN device perform transmission collaboratively, temporal synchronization among wireless LAN devices and exchange of control information being required of the wireless LAN devices. Accordingly, detailed discussion is being held in standardization of IEEE 802.11ax, with regard to temporal synchronization of wireless LAN devices and procedures for exchange of control information.

NPL 1 proposes procedures for uplink MU-MIMO. According to NPL 1, a wireless LAN base station transmits a frame that triggers initiation of uplink MU-MIMO (trigger frame). An arrangement is used where a wireless LAN device that has received the trigger frame initiates transfer of data at a predetermined point in time, if participation in the uplink MU-MIMO has been instructed by the wireless LAN base station, thereby easily enabling temporal synchronization among wireless LAN devices.

CITATION LIST

Non Patent Literature

NPL 1: IEEE 802.11-15/0331r0 Uplink Multi-User MIMO Protocol Design

SUMMARY OF INVENTION

Technical Problem

However, in a case of performing uplink MU-MIMO using the procedures described in NPL 1, the wireless LAN base station needs to comprehend information regarding data traffic of each wireless LAN device. This means that there is a need to notify information regarding data traffic of each wireless LAN device to the wireless LAN base station as control information, which complicates the wireless network.

The present invention has been made in light of the above, and it is an object thereof to disclose a method of realizing uplink multiple access while reducing complexity of wireless networks due to exchange of control information.

Solution to Problem

The terminal device, communication method, and communication system, according to the present invention, for solving the above-described problem, are as follows.

(1) That is to say, the terminal device according to the present invention is a terminal device that performs uplink multiple access communication, including a reception unit that receives a frame including uplink multiple access connection information, a first autonomous decentralized control unit that instructs securing time of a wireless resource, and a second autonomous decentralized control unit that instructs securing time of a wireless resource after reception of a frame including the uplink multiple access connection information. The terminal device is instructed securing time of the wireless resource by the first autonomous decentralized control unit in a case that a frame including the uplink multiple access connection information is not received. Securing time of the wireless resource is instructed by the second autonomous decentralized control unit in a case that a frame including the uplink multiple access connection information is received.

(2) The terminal device according to the present invention is the terminal device according to the above (1), wherein the second autonomous decentralized control unit generates a CW that is different from a CW that the first autonomous decentralized control unit generates.

(3) The terminal device according to the present invention is the terminal device according to the above (1), wherein the second autonomous decentralized control unit references information instructing transmission permissible determination within a frame including the uplink multiple access connection information. The second autonomous decentralized control unit further determines participation in uplink multiple access connection based on the information instructing transmission permissible determination.

(4) The terminal device according to the present invention is a terminal device that performs uplink multiple access communication, including a transmission unit that transmits a frame including uplink multiple access connection information, and a transmission power control unit that performs transmission power control in accordance with a type of transmission frame. The transmission unit differs in transmission power at a time of transmitting a frame including the uplink multiple access connection information and transmission power at a time of uplink multiple access transmission.

(5) The terminal device according to the present invention is the terminal device according to the above (4), wherein prior to transmission of a frame including the uplink multiple access connection information, the terminal device transmits a control signal using a transmission power than is different from the transmission power used for a frame including the uplink multiple access connection information.

(6) Also, the communication method of a terminal device according to the present invention is a communication method including at least a step of receiving a frame including uplink multiple access connection information, a step of performing first autonomous decentralized control where securing time of a wireless resource is instructed, a step of performing second autonomous decentralized control where securing time of a wireless resource is instructed after reception of a frame including the uplink multiple access connection information, a step of instructing securing time of a wireless resource by the first autonomous decentralized control in a case that a frame including the uplink multiple access connection information is not received, and a step of instructing securing time of a wireless resource by the second autonomous decentralized control in a case that a frame including the uplink multiple access connection information is received.

(7) Also, the communication method of a terminal device according to the present invention is a communication method including at least a step of receiving a frame including uplink multiple access connection information, and a step of performing first autonomous decentralized control in which securing time of a wireless resource is instructed.

(8) A communication system according to the present invention is a communication system including a first terminal device and a second terminal device. The first terminal device includes a reception unit that receives a frame including uplink multiple access connection information, a first autonomous decentralized control unit that instructs securing time of a wireless resource, and a second autonomous decentralized control unit that instructs securing time of a wireless resource after reception of a frame including the uplink multiple access connection information. The first terminal device is instructed securing time of the wireless resource by the first autonomous decentralized control unit in a case that a frame including the uplink multiple access connection information is not received. Securing time of the wireless resource is instructed by the second autonomous decentralized control unit in a case that a frame including the uplink multiple access connection information is received. The second terminal device includes a transmission unit that transmits a frame including the uplink multiple access connection information, and a transmission power control unit that performs transmission power control in accordance with a type of transmission frame. The transmission unit differs in transmission power at a time of transmitting a frame including the uplink multiple access connection information and transmission power at a time of uplink multiple access transmission.

Advantageous Effects of Invention

According to the present invention, terminal devices and a base station can form a suitable wireless network.

BRIEF DESCRIPTION OF DRAWINGS

FIG. 8 is a diagram illustrating an example of GID configuration according to the present invention.

DESCRIPTION OF EMBODIMENTS

Figure 1:
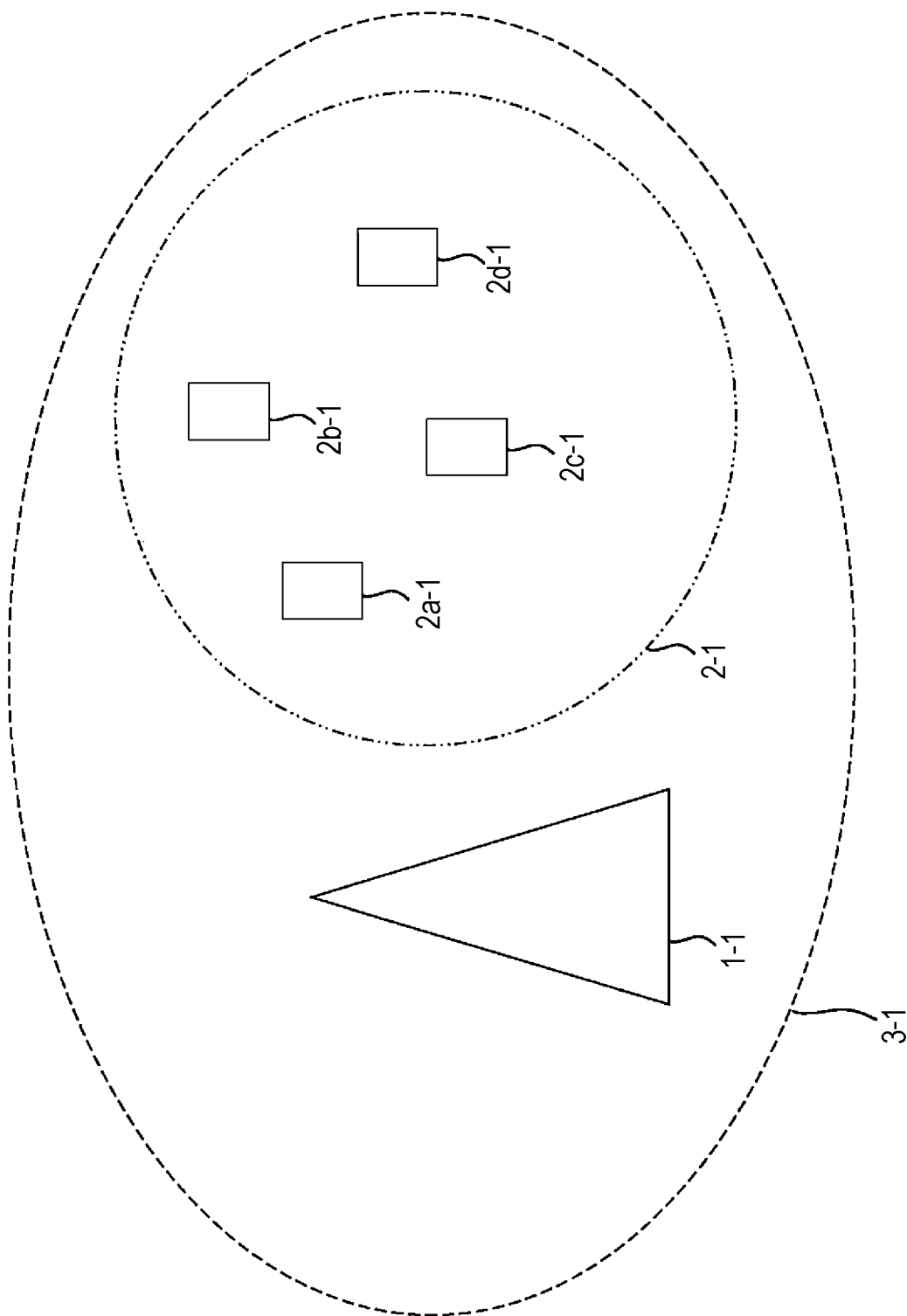
FIG. 1 is a diagram illustrating an example of the configuration of a wireless communication system according to the present invention.

A communication system according to the present embodiment includes a wireless transmission device (access point, base station device: Access point, base station device), and multiple wireless reception devices (station, terminal device: station terminal device). A network configured of the base station device and terminal devices is referred to as a basic service set (BSS: Basic service set, management range). The base station device and terminal devices are also collectively referred to as wireless devices.

The base station device and terminal devices within the BSS each perform communication based on CSMA/CA (Carrier sense multiple access with collision avoidance). Although the present embodiment deals with an infrastructure mode where a base station device communicates with multiple terminal device, the method according to the present embodiment is also executable in an ad hoc mode where terminal devices directly communicate with each other. In ad hoc mode, a terminal device serves as the base station device and forms a BSS. A BSS in ad hoc mode is also referred to as an IBSS (Independent Basic Service Set). In the following, a terminal device that forms an IBSS in ad hoc mode can be deemed as being a base station device.

In an IEEE 802.11 system, each device is capable of transmitting multiple types of transmission frames having a common frame format. Transmission frames are each defined by physical (Physical: PHY) layer, media access control (Medium access control: MAC) layer, and logical link control (LLC: Logical Link Control) layer.

A PHY layer transmission frame is referred to as a physical protocol data unit (PPDU: PHY protocol data unit, physical layer frame). A PPDU is configured of a physical layer header (PHY header) including header information and the like for performing signal processing at the physical layer, a physical service data unit (PSDU: PHY service data unit, MAC layer frame) that is a data unit processed at the physical layer, and so forth. A PSDU can be configured of an aggregated MPDU (A-MPDU: Aggregated MPDU) which is an aggregation of multiple MAC protocol data units (MPDU: MAC protocol data unit) that are retransmission increments in the wireless zone.

The PHY header includes reference signals such as short training field (STF: Short training field) used for detection, synchronization, and so forth of signals, long training field (LTF: Long training field) used for acquiring channel information for data demodulation, and so forth, and control singals such as signal (Signal: SIG) containing control information for data demodulation, and so forth. STF is also classified into legacy STF (L-STF: Legacy-STF), high throughput STF (HT-STF: High throughput-STF), very high throughput STF (VHT-STF: Very high throughput-STF), or high efficiency STF (HE-STF: High efficiency-STF), or the like, in accordance with the corresponding standard, and in the same way LTF and SIG are also classified into L-LTF, HT-LTF, VHT-LTF, HE-LTF, L-SIG, HT-SIG, VHT-SIG, and HE-SIG. VHT-SIG is further classified into VHT-SIG-A and VHT-SIG-B.

Further, the PHY header can include information for identifying the transmission source BSS of this transmission frame (hereinafter also referred to as BSS identification information). Information identifying a BSS may be an SSID (Service Set Identifier) of this BSS, for example, or a MAC address of the base station device of this BSS. Further, information identifying a BSS may be a value unique to the BSS (e.g., BSS Color or the like), other than SSID or MAC address.

PPDUs are modulated in accordance with the corresponding standard. For example, PPDUs are modulated into orthogonal frequency division multiplexing (OFDM: Orthogonal frequency division multiplexing) signals in the IEEE 802.11n standard.

An MPDU is configured of a MAC layer header (MAC header) including header information for performing signal processing at the MAC layer and so forth, a MAC service data unit (MSDU: MAC service data unit) that is a data unit process at the MAC layer, or a frame body, and a frame inspection unit (Frame check sequence: FCS) for checking whether there are no errors in the frame. Also, multiple MSDUs can be aggregated as an aggregated MSDU (A-MSDU: Aggregated MSDU).

Frame types of MAC layer transmission frames are generally classified in to the three of management frames for managing inter-device connection state and so forth, control frames for managing inter-device communication state, and data frames containing the actual communication data, each being further classified into multiple types of sub-frames. Control frames include reception complete notification (Ack: Acknowledge) frames, transmission request (RTS: Request to send) frames, reception preparation complete (CTS: Clear to send) frames, and so forth. Management frames include beacon (Beacon) frames, probe request (Probe request) frames, probe response (Probe response) frames, authentication (Authentication) frames, association request (Association request) frames, association response (Association response) frames, and so forth. Data frames include data (Data) frames, polling (CF-poll) frames, and so forth. The devices can comprehend the frame type and sub-frame type received, by reading the content of the frame control field contained in the MAC header.

Note that Block Ack may be included in Ack. Block Ack can perform reception complete notification regarding multiple MPDUs.

A beacon frame contains a cycle at which a beacon is transmitted (Beacon interval) and a field (Field) to list an SSID. A base station device can periodically notify a beacon frame within the BSS, and terminal devices can comprehend the base station device in the periphery of the terminal devices by receiving the beacon frame. Terminal devices comprehending a base station device based on a beacon frame notified by the base station device is referred to as passive scanning (Passive scanning). On the other hand, a terminal device searching for a base station by annunciation of a probe request frame within the BSS is referred to as active scanning (Active scanning). A base station device can transmit a probe response frame as a response to the probe request frame, the content described on the probe response frame being equivalent to that of a beacon frame.

After recognition of the base station device, the terminal device performs connection processing as to the base station device. Connection processing is classified into authentication (Authentication) procedures and association (Association) procedures. The terminal device transmits an authentication frame (authentication request) to the base station device regarding which connection is desired. Upon receiving the authentication frame, the base station device transmits an authentication frame (authentication response) including a status code, indicating whether authentication of the terminal device is permissible and so forth, to the terminal device. The terminal device can determine whether or not it has been permitted authentication by the base station device, by reading the status code described in authentication frame. Note that the base station device and the terminal device can exchange authentication frames multiple times.

Following authentication processing, the terminal device transmits an association request frame to the base station device to perform association procedures. Upon receiving the association request frame, the base station device determines whether or not to permit association of the terminal device, and transmits an association response frame to make notification to that effect. In addition to a status code indicating whether or not association processing is permissible, an association identification number (AID: Association identifier) of identifying the terminal device is described in the association response frame. The base station device can manage multiple terminal devices by setting different AIDs for each of the terminal devices to which association permissions have been issued.

After the association processing has been performed, the base station device and terminal device perform actual data transmission. Distributed control mechanism (DCF; Distributed Coordination Function) and centralized control mechanism (PCF: Point Coordination Function), and mechanisms where these have been extended (extended distributed channel access (EDCA: Enhanced districted channel access), hybrid control mechanism (HCF: Hybrid coordination function), etc.), are described in the IEEE 802.11 system. A case where a base station device transmits signals to a terminal device by DCF will be exemplarily described below.

In DCF, the base station device and the terminal device perform carrier sensing (CS: Carrier sense) in which the usage state of wireless channels in their periphery is confirmed, before communication. For example, in a case where the base station device that is the transmitting station receives a signal that is higher than a predetermined clear channel assessment level (CCA level: Clear channel assessment level) on this wireless channel, transmission of a transmission frame over this wireless channel is delayed. Hereinafter, a state where a signal of CCA level or higher is detected will be referred to as a busy (Busy) state, and a state where a signal of CCA level or higher is not detected as an idle (Idle) state of the wireless channel. CS performed based on power of signals each device has actually received (reception power level) in this way is referred to as physical carrier sensing (physical CS). The CCA level is also referred to as carrier sense level (CS level) or CCA threshold (CCA threshold: CCAT). In a case of detecting signals at the CCA level or higher, the base station device and terminal device start operations of at least demodulating PHY layer signals.

The base station device performs carrier sensing for a frame interval (IFS: Inter frame space) corresponding to the type of transmission frame being transmitted, and determines whether the wireless channel is in a busy state or idle state. The period over which the base station device performs carrier sensing differs depending on the frame type and sub-frame type of the transmission frame that the base station device is going to transmit. Multiple IFSs having different periods are defined in the IEEE 802.11 system, including a short frame interval (SIFS: Short IFS) used for transmission frames to which the highest priority has been given, a poling frame interval (PCF IFS: PIFS) used for transmission frames of which the priority is relatively high, a districted control frame interval DCF IFS: DIFS) used for transmission frames of which the priority is the lowest, and so forth. In a case of the base station device transmitting a data frame by DCF, the base station device uses DIFS.

After standing by for a DIFS, the base station device further stands by for a random back-off time, to prevent frame collision. A random back-off time called contention window (CW: Contention window) is used in the IEEE 802.11 system. CSMA/Ca assumes that a transmission frame transmitted from a certain transmitting station will be received by a receiving station in a state with no interference from another transmitting station. Accordingly, in a case where transmitting stations transmit transmission frames at the same timing, the frames collide, and the receiving station cannot receive correctly. Accordingly, each of the transmitting stations standing by for a randomly-set amount of time before initiating transmission avoids frame collision. Upon determining by carrier sensing that a wireless channel is in an idle state, the base station device starts a CW countdown, and can acquire a transmission right for the first time once the CW is 0, and transmit a transmission frame to the terminal device. In a case where the base station device determines by carrier sensing that the wireless channel is in a busy state during the CW countdown, the base station device stops the CW countdown. In a case where the state of the wireless channel becomes idle, the base station device resumes the remaining CW countdown following the preceding IFS.

The terminal device that is a receiving device receives the transmission frame, reads the PHY header of the transmission frame, and demodulates the received transmission frame. The terminal device can recognize whether or not the transmission frame is addressed to itself, by reading the MAC header of the demodulated signals. Note that the terminal device can also recognize the addressee of the transmission frame based on information described in the PHY header (e.g., group identification number (GID: Group identifier, Group ID) described in VHT-SIG-A).

In a case of determining that the received transmission frame has been addressed to itself, and successfully demodulating the transmission frame without error, the terminal device must transmit an ACK frame, indicating that the frame was correctly received, to the base station device that is the transmitting station. An ACK frame is one of transmission frames with the highest priority, transmitted with only a SIFS period standby (no time taken for random back-off time). The series of communication ends with the base station device receiving the ACK frame transmitted from the terminal device. In a case where the terminal device is not able to receive the frame correctly, the terminal device does not transmit an ACK. Accordingly, in a case where no ACK frame is received from the receiving station over a predetermined time (SIFS+ACK frame length) after having transmitted the frame, the base station device deems the communication to have failed, and ends the communication. In this way, ending of one time of communication in the IEEE 802.11 system (also referred to as a burst) is always determined by whether or not an ACK frame has been received, excluding cases of transmission of an annunciation signal such as a beacon frame or the like, or special cases such as cases of using fragmentation where transmission data is divided.

In a case of determining that the received transmission frame is not addressed to itself, the terminal device sets a network allocation vector (NAV: Network allocation vector), based on the length (Length) of the transmission frame described in the PHY header or the like. The terminal device does not attempt communication for the period set in the NAV. That is to say, during the period set to the NAV, the terminal device performs operations the same as a case of having determined by physical CS that the wireless channel is in a busy state, and accordingly communication control by the NAV is also referred to as virtual carrier sensing (virtual CS). In addition to cases of being set based on information described in the PHY header, the NAV is also set by a transmission request (RTS: Request to send) frame introduced to resolve a hidden node problem, and reception preparation complete (CTS: Clear to send) frames as well.

While each device performs carrier sensing and autonomously acquires transmission right in DCF, a control station called a point coordinator (PC: Point coordinator) controls the transmission rights of the devices within the BSS in PCF. Generally, the base station device serves as the PC, and the terminal devices within the BSS acquire transmission right.

A non-contention period (CFP: Contention free period) and a contention period (CP: Contention period) are included in a communication period by PCF. The above-described communication based on DCF is performed during the CP, and it is during the CFP that the PC controls the transmission right. The base station device serving as the PC performs annunciation within the BSS of a beacon frame in which is described the period of the CFP (CFP Max duration) and so forth, prior to communication by PCF. Note that PIFS is used for transmission of the beacon frame annunciated at the time of initiating PCF transmission, and transmission is performed without waiting for the CW. Terminal devices that receives the beacon frame set the CFP period described in the beacon frame to the NAV. Thereafter, the terminal devices can only acquire a transmission right in a case of receiving a signal signaling transmission right acquisition (e.g., a data frame including a CF-poll) transmitted by the PC, until the NAV elapses, or a signal annunciating the end of the CFP within the BSS ((e.g., a data frame including a CF-end) is received. Packet collisions do not occur within the same BSS during the CFP period, so the terminal devices do not use the random back-off time used in DCF.

Hereinafter, the base station device and terminal devices are also collectively referred to as wireless devices. Also, information exchanged at the time of a certain wireless device communicating with another wireless device is also referred to as data (data).

The wireless devices support multiple access (MA: Multiple Access) in uplink (UL: Uplink). Uplink multiple access (UL-MU) includes uplink spatial division multiple access (UL-SDMA: Uplink-Spatial Division Multiple Access, UL-MU-MIMO: Uplink Multi-User-Multiple Input Multiple Output), uplink frequency division multiple access (UL-FDMA: Uplink-Frequency Division Multiple Access), and non-orthogonal multiple access (NOMA: Non-Orthogonal Multiple Access). Hereinafter, a wireless device that initiates UL-MU transmission (transmits a frame notifying a UL-MU transmission initiation period, transmits a poll frame for UL-MU transmission, first transmits a frame including control information for UL-MU transmission) is also referred to as an initiator (Initiator). A wireless device that transmits a responding frame (e.g., transmits a frame for participating in UL-MU transmission, transmits a frame notifying UL-MU transmission function information) as to the frame that the Initiator first transmits to initiate UL-MU transmission (also referred to as a UL-MU poll frame) is also referred to as a responder (Responder). A wireless device that further transmits a responding frame as to a response frame transmitted by the Responder is also included in the Responder. Note that the Initiator is also referred to as a first terminal device, and the Responder is also referred to as a second terminal device.

Hereinafter, a terminal device may be a terminal device other than a base station device (e.g., a Non-AP STA), or may be a terminal device including a base station device and terminal devices (e.g., a STA). That is to say, in the following description, a base station device can perform operations described as those of a terminal device. Also, the Initiator may be operations of the base station device and the Responder be the terminal device in the present invention, or the Initiator may be the terminal device and the Responder be the terminal device. Further, the Initiator may be operations of the terminal device and the Responder the base station device in the present invention, or the Initiator may be the base station device and the Responder be the base station device.

1. First Embodiment

FIG. 1 is a diagram illustrating an example of the configuration of a wireless communication system according to the present embodiment. A base station device 1-1 and terminal stations 2a-1, 2b-1, 2c-1, and 2d-1 (hereinafter also collectively referred to as terminal devices 2-1) make up a management range 3-1. The wireless communication system may also be referred to as a BSS (Basic Service Set) or a management range. The base station device 1-1 and terminal devices 2-1 may also be collectively referred to as wireless devices 0-1.

Hereinafter, UL-MU-MIMO will be assumed as one example, but the present embodiment is applicable to common UL-MU transmission. For example, the present embodiment is applicable to UL-OFDMA (Uplink-Orthogonal Frequency Division Multiple Access) as well.

Figure 2:
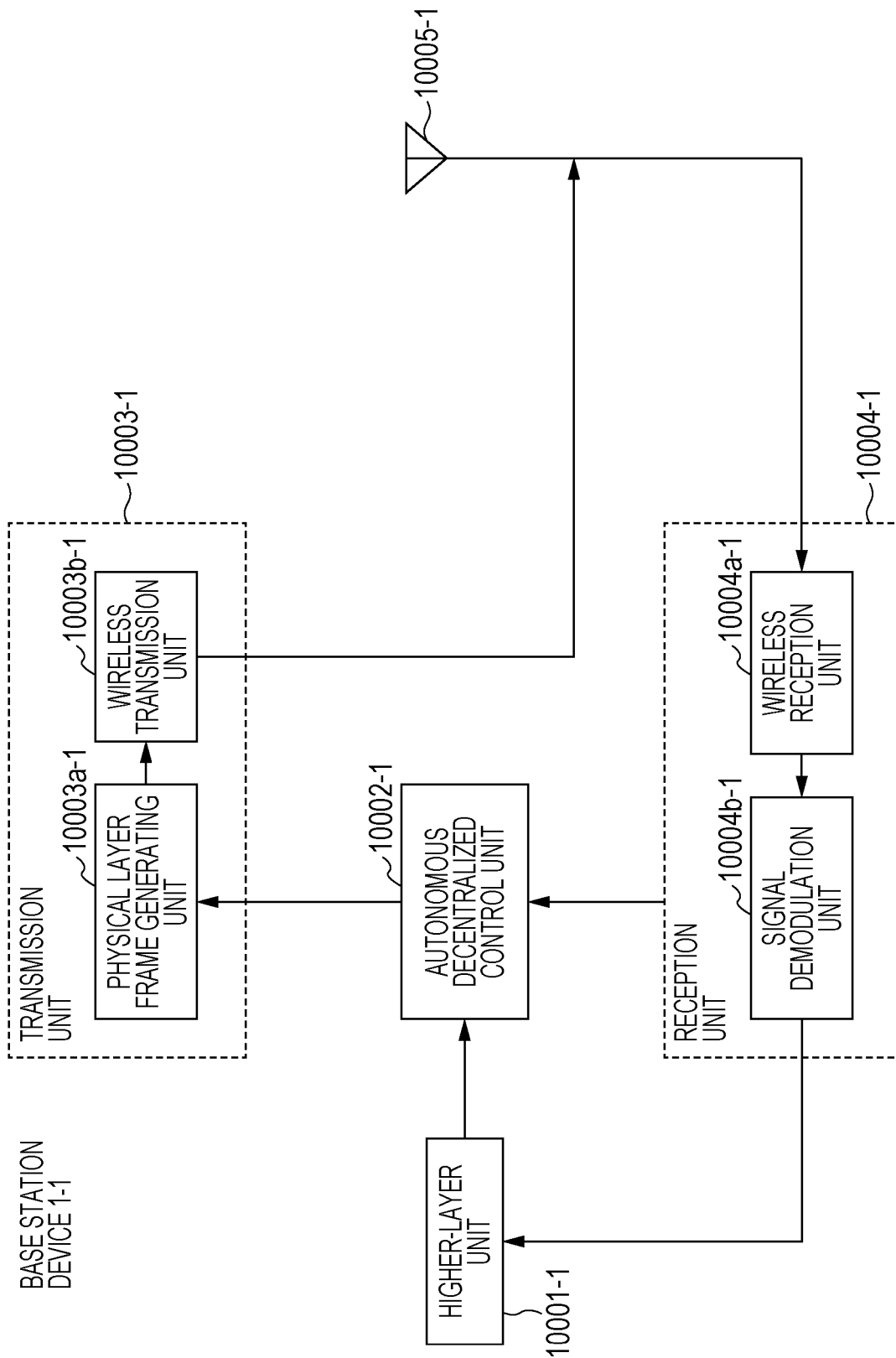
FIG. 2 is a diagram illustrating an example of the device configuration of a base station device according to the present invention.

FIG. 2 is a diagram illustrating an example of the device configuration of the base station device 1-1. The base station device 1-1 has a configuration including a higher-layer unit 10001-1, an autonomous decentralized control unit 10002-1, a transmission unit 10003-1, a reception unit 10004-1, and an antenna unit 10005-1.

The higher-layer unit 10001-1 is connected to another network, and can notify the autonomous decentralized control unit 10002-1 of information relating to traffic. Information relating to traffic may be information addressed to a device, for example, or may be control information included in a management frame or a control frame.

Figure 3:
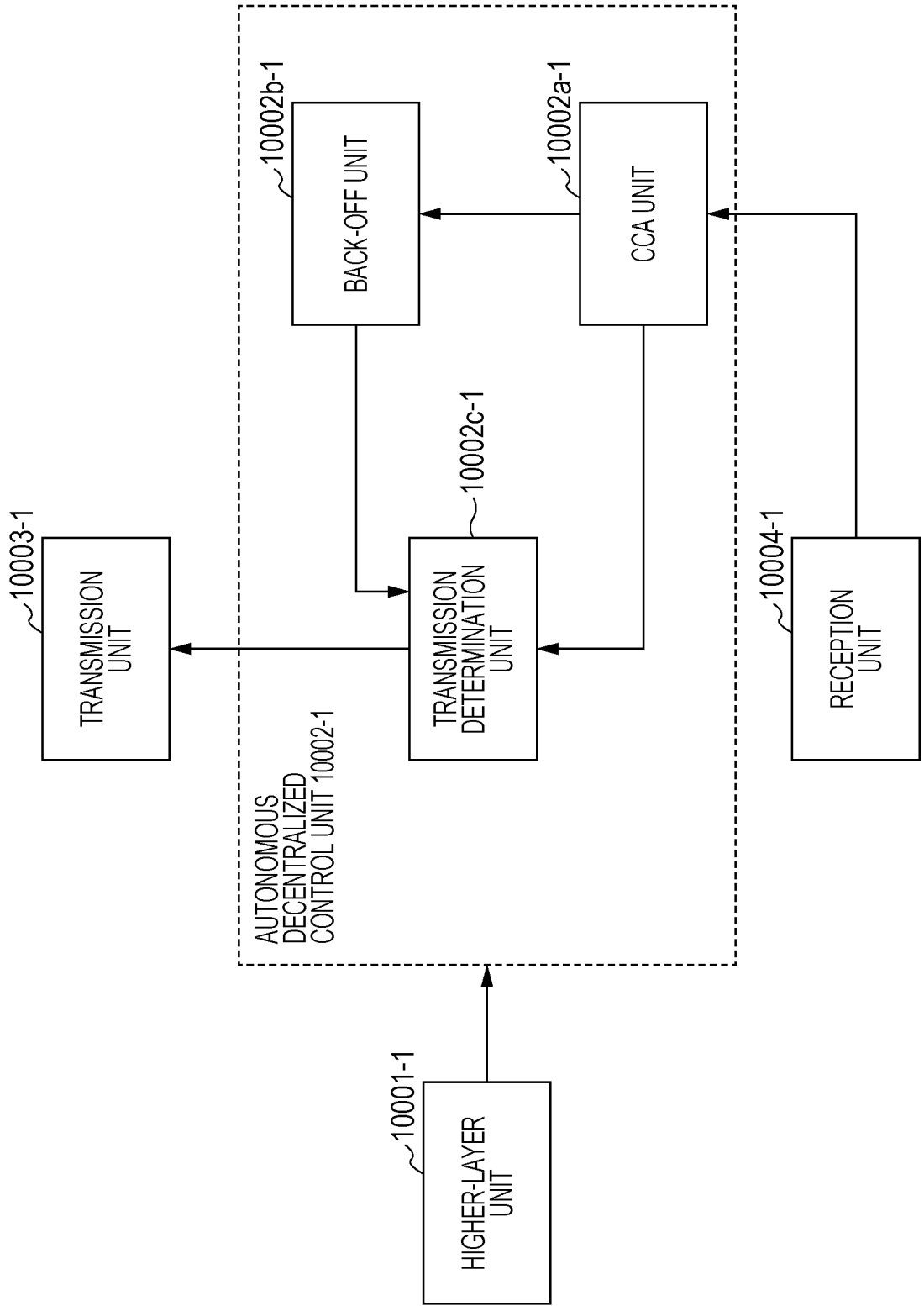
FIG. 3 is a diagram illustrating an example of the configuration of an autonomous decentralized control unit according to the present invention.

FIG. 3 is a diagram illustrating an example of the device configuration of the autonomous decentralized control unit 10002-1. The autonomous decentralized control unit 10002-1 is a configuration including a CCA unit 10002a-1, a back-off unit 10002b-1, and a transmission determination unit 10002c-1.

The CCA unit 10002a-1 can perform state determination of a wireless resource (including determination of whether busy or idle), using one or both of information relating to reception signal power of the wireless resource and information relating to reception signals (including information after decoding), notified from the reception unit 10004-1. The CCA unit 10002a-1 can notify the back-off unit 10002b-1 and transmission determination unit 10002c-1 of state determination information regarding this wireless resource.

The back-off unit 10002b-1 has a function of performing back-off processing using state determination information of the wireless resource. The back-off unit 10002b-1 can generate a CW, and further can perform countdown of the CW. For example, in a case where the state determination information of the wireless resource indicates idle, countdown of the CW can be performed, and in a case where the state determination information of the wireless resource indicates busy, countdown of the CW can be stopped. The back-off unit 10002b-1 can notify the transmission determination unit 10002c-1 of the value of the CW.

Note that normal operations of the back-off unit 10002b-1 in a case where no frame including an MU initiation frame (or MU Information) is received is also referred to as a first back-off (or first back-off unit), and operations of the back-off unit 10002b-1 in a case where a frame including an MU initiation frame (or MU Information) is received is also referred to as a second back-off (or second back-off unit). MU initiation frames and MU Information will be described later. Also, hereinafter, in a case where the back-off unit 10002b-1 generates a CW, setting of a point in time at which transmission standby due to the CW ends, is also referred to as the back-off unit instructing wireless resource securing time. That is to say, operations of the back-off unit 10002b-1 can be restated as generating a CW and instructing wireless resource securing time to the base station device 1-1.

Also, hereinafter, normal operations of the autonomous decentralized control unit 10002-1 in a case where no frame including an MU initiation frame (or MU Information) is received is also referred to as first autonomous decentralized control (or first autonomous decentralized control unit, first wireless resource securing), and operations of the autonomous decentralized control unit 10002-1 in a case where a frame including an MU initiation frame (or MU Information) is received is also referred to as second autonomous decentralized control (or second autonomous decentralized control unit, second wireless resource securing).

The transmission determination unit 10002c-1 performs transmission determination using one or both of the state determination information of the wireless resource and the value of the CW. For example, if the state determination information of the wireless resource indicates idle and the value of the CW is 0, the transmission unit 10003-1 can be notified of the transmission determination information. Alternatively, if the state determination information of the wireless resource indicates idle, the transmission unit 10003-1 can be notified of the transmission determination information.

The transmission unit 10003-1 is a configuration including a physical layer frame generating unit 10003a-1 and a wireless transmission unit 10003b-1. The physical layer frame generating unit 10003a-1 has a function of generating physical layer frames based on transmission determination information notified from the transmission determination unit 10002c-1. The physical layer frame generating unit 10003a-1 subjects physical layer frames to error-correction encoding, modulation, prerecording filter multiplication, and so forth. The physical layer frame generating unit 10003a-1 notifies the wireless transmission unit 10003b-1 of the generated physical layer frames.

The wireless transmission unit 10003b-1 converts the physical layer frames generated by the physical layer frame generating unit 10003a-1 into radio frequency (RF: Radio Frequency) band signals, thereby generating radio frequency signals. The processing performed by the wireless transmission unit 10003b-1 includes digital-to-analog conversion, filtering, frequency conversion from baseband band to RF band, and so forth.

The reception unit 10004-1 is a configuration including a wireless reception unit 10004a-1 and a signal demodulation unit 10004b-1. The reception unit 10004-1 generates information relating to reception signal power from RF band signals that the antenna unit 10005-1 receives. The reception unit 10004-1 can notify the CCA unit 10002a-1 of information relating to reception signal power and information relating to reception signals.

The wireless reception unit 10004a-1 has a function of converting the RF band signals received by the antenna unit 10005-1 into baseband signals, and generating physical layer signals (e.g., physical layer frames). The processing performed by the wireless reception unit 10004a-1 includes frequency conversion processing from RF band to baseband band, filtering, and analog-to-digital conversion.

The signal demodulation unit 10004b-1 has a function of demodulating physical layer signals generated by the wireless reception unit 10004a-1. The processing performed by the signal demodulation unit 10004b-1 includes channel equalization, de-mapping, error-correction decoding, and so forth. The signal demodulation unit 10004b-1 can extract information included in the physical layer header, information included in the MAC header, and information included in the transmission frame, for example from the physical layer signals. The signal demodulation unit 10004b-1 can notify the higher-layer unit 10001-1 of the extracted information. Note that the signal demodulation unit 10004b-1 can extract any or all of the information included in the physical layer header, information included in the MAC header, and information included in the transmission frame.

The antenna unit 10005-1 has a function of transmitting radio frequency signals generated by the wireless transmission unit 10003b-1 into the wireless space toward the wireless devices 0-1. The antenna unit 10005-1 also has a function of receiving radio frequency signals transmitted from the wireless devices 0-1.

The device configuration of the terminal device 2-1 is the same as that of the base station device 1-1, so description will be omitted.

Figure 4:
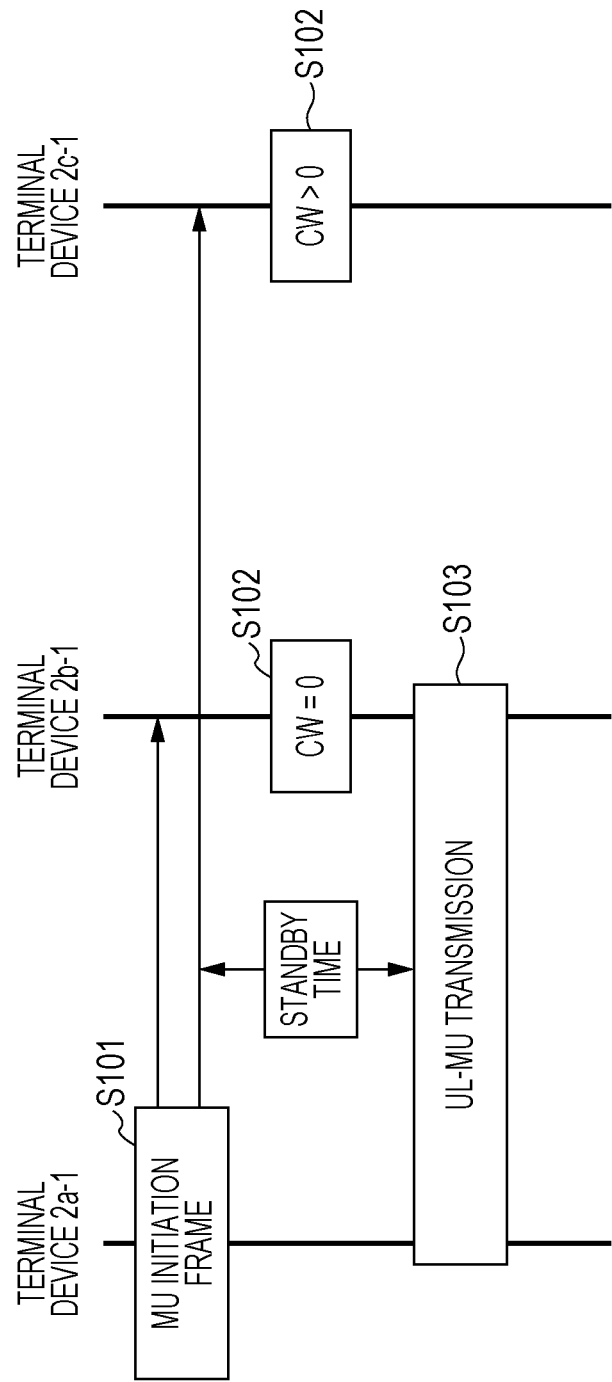
FIG. 4 is a sequence chart illustrating an example of procedures for UL-MU transmission according to the present invention.

FIG. 4 is a sequence chart illustrating an example of procedures for UL-MU transmission according to the first embodiment. Note that the example illustrated in FIG. 4 is applicable to any MU upper limit number. An MU upper limit number is the upper limit value of the number of terminal devices 2-1 that the base station device 1-1 can receive at the same time in a case where multiple terminal devices 2-1 transmit at the same time by UL-MU transmission. For example, in UL-MU-MIMO, the MU upper limit number preferably is equal to or less than the number of antenna elements of the base station device 1-1. In UL-OFDMA, the MU upper limit number can be decided based on the number of divisions of the frequency band (Granularity: granularity). Note that in a case of applying non-orthogonal access (a method of multiplexing multiple terminal devices on the same wireless resource), this does not hold regarding the MU upper limit number, and the value may be greater than the number of antenna elements even in the case of UL-MU-MIMO. The MU upper limit number is also referred to as maximum number of multiple users, maximum number of simultaneously transmitting terminals, number of permissible multiple users, number of permissible multiple transmitting terminals, and so forth.

In the example illustrated in FIG. 4, terminal device 2a-1 has initiated UL-MU transmission procedures. The terminal device 2a-1 transmits an MU initiation frame to the terminal device 2b-1 and terminal device 2c-1 (step S101). The MU initiation frame preferably includes a transmitting source address (the address of the terminal device 2a-1 in the example illustrated in FIG. 4), and information relating to an UL-MU transmission start point-in-time, but does not need to include this. The base station device 1-1 and terminal device 2-1 can transmit the MU initiation frame. The transmitter of the MU initiation frame is also referred to as the Initiator, and the receiver of the MU initiation frame is also referred to as the Responder. Details of the MU initiation frame configuration will be described later.

Next, the terminal device 2b-1 and terminal device 2c-1 that have received the MU initiation frame perform CW countdown (step S102). The terminal device which has reached CW=0 within the UL-MU transmission initiation time as a result of the CW countdown (the terminal device 2b-1 in the example illustrated in FIG. 4) initiates UL-MU transmission (step S103).

On the other hand, a terminal device does not reach CW of 0 within the UL-MU transmission initiation time (the terminal device 2c-1 in the example illustrated in FIG. 4) does not participate in the UL-MU transmission.

The terminal device 2-1 can initiate UL-MU transmission in a suitable manner by the procedures of steps S101 through S103.

Figure 5:
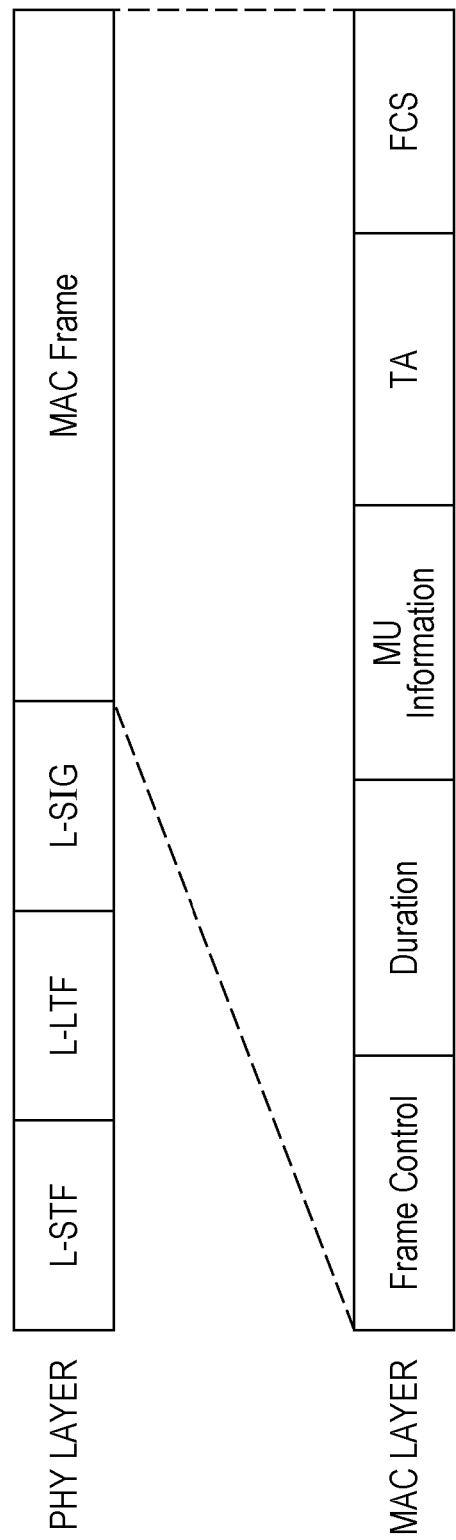
FIG. 5 is a diagram illustrating an example of the configuration of an MU initiation frame according to the present invention.

FIG. 5 is a diagram illustrating an example of the configuration of an MU initiation frame. The PHY layer frame has a configuration including L-STF and L-LTF and L-SIG and a MAC Frame, the MAC Frame (MAC Frame) including a Frame Control field, a Duration field, an MU Information field, a TA (Transmitter Address) field, and a FCS field. The Frame Control field is a field including information relating to frame type and so forth, and the Duration field is a field including information relating to NAVE settings (information relating to the length of a transmission burst containing a reception complete notification). That TA field is a field including information relating to the address of the transmission source.

The MU Information field is a field including MU Information. MU Information can include information used in the UL-MU transmission according to the present embodiment. For example, MU Information can contain any or all of information relating to the UL-MU transmission initiation time, information relating to a CW generation method, and information relating to a countdown method, information indicating information identifying a group of the terminal devices 2-1 (sub-group information), information relating to an LTF (or wireless resource) generation method, and information of an LTF (or wireless resource) transmission method.

Note that the configuration of an MU initiation frame is not restricted to the example illustrated in FIG. 5, and that any configuration may be used as long as it is a frame that triggers UL-MU transmission. Further, a frame having a configuration equivalent to a control frame such as RTS or CTS can be used as an MU initiation frame, to protect terminal devices that do not have functions to receive MU initiation frames (hereinafter also referred to as legacy terminal devices). The configuration of an MU initiation frame may be the same as the configuration of a control frame such as RTS or CTS, with only part of information in the fields being different, as in the example illustrated in FIG. 5, so as to have a frame configuration receivable by legacy terminal devices.

An MU initiation frame can include information relating to the upper limit number of terminal devices participating in UL-MU transmission (MU upper limit number information), based on UL-MU transmission function information of the management range 3-1. The base station device 1-1 can notify the terminal devices 2-1 of function information regarding UL-MU transmission of the BSS 3-1, such as information of whether or not the BSS 3-1 has UL-MU transmission functions, information of whether or not the BSS 3-1 has functions of transmitting and receiving MU initiation frames, information relating to permission of UL-MU transmission, information indicating transmission permission of MU initiation frames, and information relating to the upper limit of the number of participating terminal devices in UL-MU transmission. An MU initiation frame transmitted by the terminal devices 2-1 preferably includes MU upper limit number information that indicates a value equal to or smaller than information relating to the upper limit of the number of participating terminal devices in UL-MU transmission. Each of the terminal devices 2-1 can use multiple wireless resources. Now, if the MU upper limit number information is NMU, the number of wireless resources that a terminal device 2-$x$ uses in a certain UL-MU transmission is Nx, and a group of terminal devices 2-1 participating in the UL-MU transmission is U, Nmu ExYNx is preferable.

The terminal devices 2-1 (or transmission determination unit 10002$c$-1, autonomous decentralized control unit 10002-1) perform determination of whether transmittable, based on information relating to UL-MU transmission initiation time. For example, even after having received an MU initiation frame, the terminal devices 2-1 can continue the CW countdown, and initiate UL-MU transmission in a case where the CW reaches 0 within the UL-MU transmission initiation time. Alternatively, for example, determination of whether transmittable may be performed based on the CW value at the point of receiving an MU initiation frame. For example, the terminal devices 2-1 can add information relating to a CW threshold value to an MU initiation frame. An arrangement may be made where a terminal device 2-1 acquires information relating to the CW threshold value within the MU initiation frame, and UL-MU transmission is initiated in a case where the CW value that this terminal device 2-1 holds is a value equal to or lower than the CW threshold value, or UL-MU transmission is initiated in a case of a value equal to or greater than the CW threshold value.

Also, the terminal devices 2-1 can generate CW used in a dedicated manner for UL-MU transmission (hereinafter also referred to as an MUCW), based on information relating to a CW generation method within an MU initiation frame. A back-off used in a dedicated manner for UL-MU transmission is referred to as an MU back-off. Details of a method for MU back-off will be described later.

Note that information relating to the UL-MU transmission initiation time can be set using an IFS (e.g., DIFS, SIFS, etc.). In formation relating to the UL-MU transmission initiation time can also be set using information relating to time sections (e.g., number of slots (slot)).

A terminal device 2-1 can attach information relating to wireless sources used by this terminal device 2-1, information relating to reference signal generation method, and information relating to reference signal transmission method, to an MU initiation frame.

For example, a case will be assumed where a terminal device 2-1 that is the Initiator transmits an MU initiation frame, and a wireless resource that this terminal device 2-1 uses is RA. Terminal devices 2-1 other than this terminal device 2-1 (or Responder will suffice) receive the MU initiation frame, and use a wireless resource RB other than the wireless resource RA used by the Initiator, whereby UL-MU transmission can be suitably carried out. For example, in the example illustrated in FIG. 4, information relating to a wireless resource used by terminal device 2$a$-1 can be attached to an MU initiation frame transmitted by the terminal device 2$a$-1. The terminal device 2$b$-1 can know the wireless resource used by the terminal device 2$a$-1, so suitable UL-MU transmission can be performed by using a wireless resource other than the wireless resource used by the terminal device 2$a$-1. For example, in a frequency division multiple access system such as OFDMA or the like, a wireless resource may be information relating to a channel (e.g., channel No. (index)).

Also, for example, a case will be assumed where a terminal device 2-1 that is the Initiator transmits an MU initiation frame, and a reference signal (e.g., LTF) generation method that this terminal device 2-1 uses is GA. Terminal devices other than this terminal device 2-1 (or Responder will suffice) receive the MU initiation frame, and use a reference signal generation method GB other than the reference signal generation method GA used by the Initiator, whereby UL-MU transmission can be suitably carried out. For example, in the example illustrated in FIG. 4, information relating to a reference signal generation method used by this terminal device 2$a$-1 can be attached to an MU initiation frame transmitted by the terminal device 2$a$-1. The terminal device 2$b$-1 can know the reference signal generation method used by the terminal device 2$a$-1, so suitable UL-MU transmission can be performed by using a reference signal generation method other than the reference signal generation method used by the terminal device 2$a$-1. For example, in UL-MU-MIMO or DCMA (Code Division Multiple Access, code division multiple access), a reference signal generation method may be a generation method (e.g., scrambling, encoding, cyclic shift amount, etc.) for a reference signal (e.g., channel estimation reference signal, LTF, etc.).

Also, for example, a case will be assumed where a terminal device 2-1 that is the Initiator transmits an MU initiation frame, and a reference signal transmission method that this terminal device 2-1 uses is TA. Terminal devices 2-1 other than this terminal device 2-1 (or Responder will suffice) receive the MU initiation frame, and use a reference signal transmission method TB other than the reference signal transmission method TA used by the Initiator. For example, in the example illustrated in FIG. 4, information relating to a reference signal transmission method used by terminal device 2a-1 can be attached to an MU initiation frame transmitted by the terminal device 2a-1. The terminal device 2b-1 can know the reference signal transmission method used by the terminal device 2a-1, so suitable UL-MU transmission can be performed by using a reference signal transmission method other than the reference signal transmission method used by the terminal device 2a-1. For example, in UL-MU-MIMO or DCMA (Code Division Multiple Access, code division multiple access), a reference signal transmission method may be a transmission method (e.g., specification method of transmission point-in-time, specification method of transmission band, specification method of transmission carrier, specification method of transmission power, etc.) for a reference signal (e.g., channel estimation reference signal, LTF, etc.).

The Base station device 1-1 can suitably perform propagation channel estimation regarding each terminal device 2-1 by using the above method.

For example, an MU initiation frame may include either or both of CWmin including information relating to the maximum value of the CW and CWmax including information relating to the minimum value of the CW. The back-off unit 10002b-1 can decide the range of the MUCW to be set based on either or both of CWmin and CWmax, acquire a random value, and set to the MUCW. The method of the back-off unit 10002b-1 generating an MUCW is not restricted to this. The method of generating an MUCW preferably is a method that avoids more terminal devices than the MU upper limit number from participating in the UL-MU transmission. The MUCW may be a random value not based on another value, or may be a fixed value.

Figure 6:
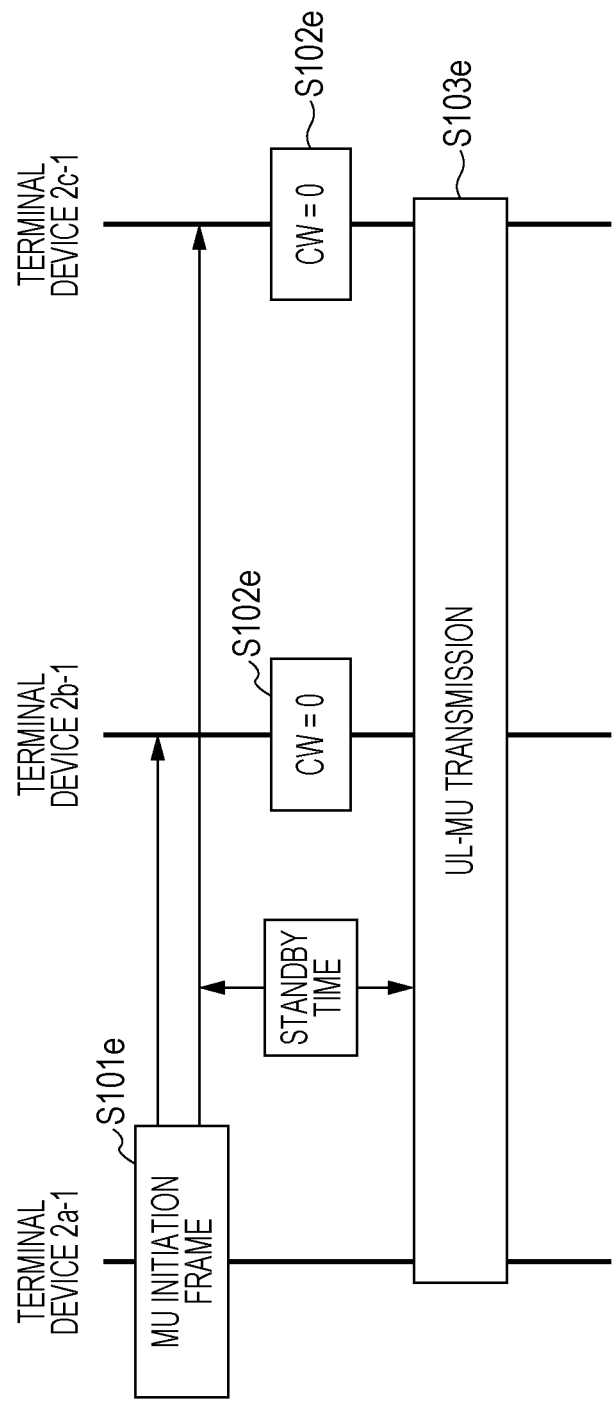
FIG. 6 is a sequence chart illustrating an example of procedures for UL-MU transmission according to the present invention.

FIG. 6 is a sequence chart illustrating another example of procedures for UL-MU transmission according to the first embodiment. The example illustrated in FIG. 6 illustrates processing in a case where transmissions of MU participation frames have collided. The procedures of processing illustrated in FIG. 6 is applicable to any MU upper limit number.

The terminal device 2a-1 transmits an MU initiation frame (step S101e). The back-off units 10002b-1 relating to the terminal device 2b-1 and the terminal device 2c-1 execute CW countdown (Step S102e). The terminal devices 2-1 which have reached CW=0 (the terminal device 2b-1 and terminal device 2c-1 in the example illustrated in FIG. 6) initiate UL-MU transmission (step S103e).

The terminal device 2b-1 and terminal device 2c-1 can use different wireless resources from the terminal device 2a-1, based on the usage method of wireless resources by the terminal device 2a-1 (e.g., selection method of wireless resource to use, reference signal generation method, reference signal transmission method). However, the terminal device 2b-1 and terminal device 2c-1 do not know the wireless resource usage method of each other, and accordingly there is a possibility that they will use the same wireless resource usage method. It is preferable in the present embodiment to have prepared more wireless resource usage methods than the MU upper limit number. In this case, the terminal device 2b-1 and terminal device 2c-1 can avoid selecting the same wireless resource (hereinafter also referred to as collision, or Collision), by randomly selecting one from wireless resource usage methods other than the wireless resource usage method of the terminal device 2a-1. Note that the MU initiation frame can also specify the wireless resource usage method of the Responder.

Next, a method for suitably executing UL-MU transmission according to the present embodiment will be described. In order for the base station device 1-1 to perform AGC (Automatic Gain Control) and symbol synchronization in UL-MU transmission, it is preferable that signal intensities arriving from the terminal devices 2-1 do not deviate. Also, in a case of UL-MU transmission being executed by spatial multiplexing of the terminal devices 2-1, signal intensities arriving from the terminal devices 2-1 preferably do not deviate, in order to maintain the capabilities of the base station device 1-1 to divide the signals arriving from the terminal devices 2-1.

For example, the terminal device 2-1 that is the Initiator can perform transmission power control for MU initiation frames, management frames, and control frames, as a method so that signal intensities arriving from the terminal devices 2-1 as observed by the base station device 1-1 do not deviate.

For example, the terminal device 2-1 that is the Initiator can perform transmission power control of MU initiation frames. For example, the terminal devices 2-1 that can participate in the UL-MU transmission can be grouped (classified) by transmitting a MU initiation frame at a low power. Grouping is an act of extracting a part of terminal devices 2-1 that satisfy predetermined conditions, using the information relating to the environments, locations, properties, functions, and so forth, of the terminal devices 2-1. For example, transmitting an MU initiation frame at a low transmission power enables the terminal devices 2-1 that can receive this MU initiation frame to be restricted. This is because the range of terminal devices 2-1 that can receive this MU initiation frame has been narrowed, by this MU initiation frame being transmitted by small power transmission.

For example, the terminal device 2-1 that is the Initiator can execute transmission power control when transmitting MU initiation frames. This terminal device 2-1 can transmit MU initiation frames with reduced transmission power as to frames other than MU initiation frames, such as data frames, management frames, control frames, and so forth. Transmission can also be performed of an MU initiation frame with reduced transmission power as to frames before executing transmission of the MU initiation frame (e.g., data frames, management frames, control frames, and so forth, particularly Ack frames, RTS frames, CTS frames, beacon frames, etc.). Note that, for example, after a frame prior to executing transmission of an MU initiation frame has been transmitted, an MU initiation frame can be transmitted after standby of an IFS (e.g., SIFS, PIFS, DIFS, EIFS, AIFS, etc.) period or another predetermined period (period stipulated by the number of slots, etc.) Also, an arrangement may be made where no period is provided between a frame before executing transmission of an MU initiation frame and transmission of the MU initiation frame, and transmission may be made as an aggregated (Aggregation) frame. The distance between the terminal devices 2-1 participating in the UL-MU transmission is reduced due to the terminal device 2-1 that is the Initiator executing transmission power control, so the amount of deviation in signal intensities arriving from the terminal devices 2-1 (or Initiator and Responder) participating in the UL-MU transmission is reduced, and the base station device 1-1 can perform suitable AGC and symbol synchronization.

Figure 7:
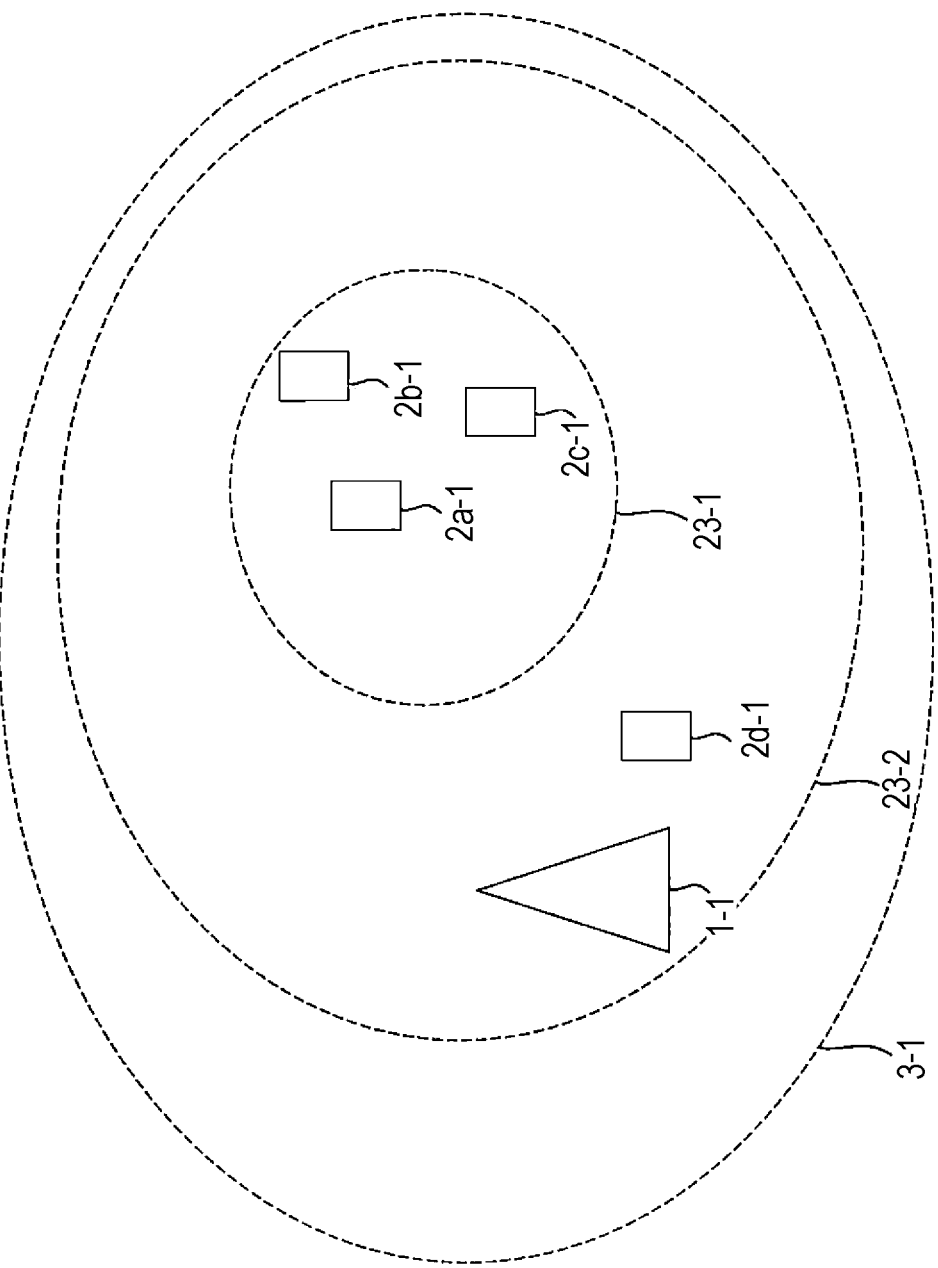
FIG. 7 is a diagram illustrating an example of the configuration of the wireless communication system according to the present invention.

FIG. 7 is a schematic diagram illustrating another example of the wireless communication system according to the present embodiment. Note that the base station device 1-1 and the terminal devices 2-1 making up the wireless communication system illustrated in FIG. 7 only differ from the base station device 1-1 and the terminal devices 2-1 making up the wireless communication system illustrated in FIG. 1 with regard to location information (or propagation channel information) thereof, and are of the same configuration, so description will be omitted. Note that in the example illustrated in FIG. 7, the terminal device 2a-1 is assumed to be the Initiator (hereinafter may also be referred to simply as Initiator) and the transmitter of an MU initiation frame. For example, a range where signals transmitted by transmission power used to perform transmission of the MU initiation frame reach (although arrival of signals is not restricted, this may be defined as, for example, a receiving wireless device being able to suitably demodulate or decode signals, being able to detect a preamble, and so forth, or may be defined as reception sensitivity of X dBm or above (the value of X is not restricted, and X dBm or lower may be suitable)) will be referred to as range 23-1. A range where signals transmitted by transmission power used to perform transmission of frames other than the MU initiation frame reach (e.g., frames transmitted in UL-MU transmission, RTS frames, CTS frames, etc.) will be referred to as range 23-2. Hereinafter, assumption will be made that the signal intensity of the terminal devices 2-1 as observed by the base station device 1-1 is such that deviation is not occurring that would prevent the base station device 1-1 from suitably performing AGC or symbol synchronization with regard to the terminal device 2a-1 (in a case of using transmission power defining the range 23-2), terminal device 2c-1, and terminal device 2d-1, and that the signal intensity of the terminal device 2d-1 is deviated from the signal intensity of the terminal device 2a-1, terminal device 2b-1, and terminal device 2c-1, to where the base station device 1-1 does not suitably perform AGC or symbol synchronization.

In a case where the Initiator transmits an MU initiation frame at transmission power defining the range 23-2, the terminal device 2b-1, terminal device 2c-1, terminal device 2d-1, and base station device 1-1 can receive the MU initiation frame. That is to say, in the example illustrated in FIG. 7, the terminal device 2b-1, terminal device 2c-1, terminal device 2d-1, and base station device 1-1 can be a Responder. For example, assumption will be made that the terminal device 2b-1, and terminal device 2c-1, and terminal device 2d-1 are Responders, and the base station device 1-1 performs reception of the UL-MU transmission. In this case, the Initiator and Responders execute the UL-MU transmission, so the base station device 1-1 cannot suitably perform AGC or symbol synchronization.

Accordingly, the Initiator can perform transmission power control where the MU initiation frame is transmitted using transmission power defining the range 23-1. By the Initiator performing transmission power control, the Responders are grouped into the terminal device 2b-1 and terminal device 2c-1. The terminal device 2d-1 does not participate in the UL-MU transmission, so base station device 1-1 can suitably perform AGC and symbol synchronization.

Note that in the example illustrated in FIG. 7, the base station device 1-1 cannot receive the MU initiation frame transmitted by the Initiator, and accordingly cannot be notified beforehand that the UL-MU transmission frame will be transmitted. The base station device 1-1 preferably is notified beforehand that the UL-MU transmission frame will be transmitted. Hereinafter, a notification method of starting UL-MU transmission to the base station device 1-1 by changing the MCS will be described as one example.

The Initiator transmits a MU initiation frame using transmission power defining the range 23-2, for example, but just the MAC frame in the MU initiation frame can have the MCS changed. Alternatively, just the MU Information can have the MCS changed to perform encoding and modulation. For example, adding information notifying that UL-MU transmission will be initiated to the PHY header within the MU initiation frame, and selecting a suitable MCS so that the PHY header information can be decoded by the wireless devices 0-1 within the range 23-2, enables the base station device 1-1 to be notified that UL-MU transmission will be initiated after the MU initiation frame. Also, by encoding and modulating the MU Information or MAC frame by an MCS that cannot be decoded by the terminal device 2d-1 but can be suitably decided by the terminal device 2b-1 and terminal device 2c-1, the MU initiation frame reaches the terminal device 2d-1 but the MU Information cannot be decoded. Accordingly, the terminal device 2d-1 does not participate in the UL-MU transmission, so the base station device 1-1 can suitably perform AGC and symbol synchronization.

Also, another example of executing UL-MU transmission more suitably by executing control frame transmission will be described. For example, the Initiator can transmit a control frame such as a transmission request frame (RTS, etc.) or a reception preparation interference frame (CTS) or the like immediately prior to transmitting an MU initiation frame. A frame that the Initiator transmits immediately prior to the MU initiation frame is also referred to as an MU transmission preparation frame. An MU transmission preparation frame can include information that UL-MU transmission will be initiated, for example. The base station device 1-1 can receive the MU initiation frame and acquire information that UL-MU transmission will be initiated, by the Initiator transmitting an MU transmission preparation frame using transmission power defining the range 23-2, whereby the base station device 1-1 can be notified that UL-MU transmission will be initiated.

Transmission of an MU transmission preparation frame can also be used for protection from legacy terminal devices. For example, an MU transmission preparation frame may have a frame configuration that is decodable by a legacy terminal device. In this case, a legacy terminal device situated within the range 23-2 can receive the MU transmission preparation frame. Accordingly, the Initiator can insert, into the Duration field, information relating to the UL-MU transmission (alternatively, Ack response that the base station device 1-1 transmits after UL-MU transmission) ending time (also referred to as Duration, length, wireless resource securing period, wireless resource reservation period, reservation period information, transmission period information, etc., for example). Note that the wireless resource securing period may be inserted into the PHY header (e.g., length field), MAC header, or data portion or the like.

Also, another example of executing UL-MU transmission more suitably by setting CCA conditions will be described. For example, the base station device 1-1 and the terminal devices 2-1 can hold information relating to conditions for participating in UL-MU transmission (MU participation permissibility determination information). For example, MU participation permissibility determination information may be a value restricting the reception signal intensity of the MU initiation frame. For example, a case will be assumed where the terminal device 2d-1 may participate in the UL-MU transmission in a case where the signal intensity of the MU initiation frame (e.g., RSSI (Received Signal Strength Indicator), RCPI (Received Channel Power Indicator), etc.) is Y dBm or above (the value of Y is not restricted, and Y dBm or lower may be suitable)), as the MU participation permissibility determination information. In a case where an MU initiation frame transmitted by the Initiator is measured as being Y dBm or lower by the terminal device 2d-1, the terminal device 2d-1 cannot participate in the UL-MU transmission. On the other hand, in a case where an MU initiation frame transmitted by the Initiator is measured as being Y dBm or higher by the terminal device 2d-1, the terminal device 2c-1 can participate in the UL-MU transmission, and can execute suitable UL-MU transmission.

Also, the Initiator can include MU participation permissibility determination information in the MU initiation frame and transmit, for example. For example, the Initiator can change the content of the MU participation permissibility determination information for each UL-MU transmission. Accordingly, the Initiator can change the content of the MU participation permissibility determination information in accordance with the traffic information and channel information.

Also, the base station device 1-1 can transmit MU participation permissibility determination information to the terminal devices 2-1. The base station device 1-1 can include MU participation permissibility determination information in beacons, probe responses, authentication responses, association responses, etc., for example.

MU participation permissibility determination information is not restricted to information relating to restriction of signal intensity. The MU participation permissibility determination information may be information relating to grouping in accordance with functions that the terminal devices 2-1 have or do not have, may be information grouped by indices of the terminal devices 2-1 (indicator, ID, index, AID, SID, TID, etc.), or may be a GID, for example.

FIG. 8 is a diagram illustrating an example of a GID configuration. A GID is a configuration where information relating to addresses indicating the terminal devices 2-1 has been stored in respective blocks. In the example illustrated in FIG. 8, a group of terminal devices is allocated to each GID (Group ID). For example, GID1 indicates information relating to STA2, STA3, STA4, and STA5. A GID indicates information relating to the order of addresses of terminal devices. Alternatively, a GID has a configuration where the order of terminal devices is understood. For example, GID1 and GID2 are made up of the same terminal devices, but the order of the terminal device configuration is different. Hereinafter, the expression n'th terminal device will be used to distinguish the order in the GID configuration. For example, in GID31 the 1st terminal device is STA6, the 2nd terminal device is STA2, the 3rd terminal device is STA4, and the 4th terminal device is STA8.

For example, a terminal device 2-1 receiving an MU initiation frame can perform determination of participation permissibility to the UL-MU transmission by the Initiator including a GID in the MU initiation frame as MU participation permissibility determination information. For example, settings may be made such that in a case where the MU participation permissibility determination information included in a received MU initiation frame includes information indicating this terminal device 2-1, participation in the UL-MU transmission is permitted, or settings may be made such that participation in the UL-MU transmission is permitted in a case where information indicating this terminal device 2-1 is not included.

Next, a method for executing UL-MU transmission more suitably by transmission power control will be described. This is a method where each terminal device 2-1 performs transmission power control in the UL-MU transmission, to avoid deviation in signal intensity of the terminal devices 2-1 as observed by the base station device 1-1.

For example, the Initiator may be transmitted including signal intensity request information in an MU initiation frame. The signal intensity request information is information indicating signal intensity observed by the base station device 1-1. For example, signal intensity request information of Z dBm (Z is not restricted) means that in a UL-MU transmission triggered by this MU initiation frame, the request for signal intensity of each terminal device 2-1 is Z dBm.

For example, a terminal device 2-1 receive an MU initiation frame including signal intensity request information (signal intensity of Z dBm, as one example). The terminal device 2-1 performs transmission power control based on information relating to the propagation channel (e.g., propagation loss, path loss, long-span median value, short-span median value, link margin, instantaneous propagation channel, etc.) between the base station device 1-1 and this terminal device 2-1. For example, assuming that the propagation loss between the base station device 1-1 and the terminal device 2-1 is Z2-1 dB, the terminal device 2-1 can calculate the transmission power P by P=-Z2-1-Z. The deviation of signal intensity of the terminal devices 2-1 as observed by the base station device 1-1 can be reduced by transmission power control by the terminal devices 2-1, whereby suitable UL-MU transmission can be performed.

Note that signal intensity request information is not restricted to the above. Any arranngement may be used as long as information relating to the propagation channel between the base station device 1-1 and the terminal devices 2-1.

The base station device 1-1 can also notify signal intensity request information to the terminal devices 2-1. For example, the base station device 1-1 can include signal intensity request information in beacons, probe responses, authentication responses, association responses, etc., for example.

As described above, suitable UL-MU transmission can be realized by applying the present embodiment to a wireless network. Improvement in frequency efficiency is realized while easily realizing a wireless network configuration.

2. Common to all Embodiments

A program running on the base station device 1-1 and terminal devices 2-1 according to the present invention is a program that controls a CPU or the like (a program that causes a computer to function) so as to realize the functions of the above-described embodiments according to the present invention. Information handled by these devices is temporarily stored in RAM at the time of processing, thereafter is stored in various types of ROM or HDDs, read out by the CPU as necessary, and modification/wiring is performed. A recording medium storing the program may be any of semiconductor media (e.g., ROM, nonvolatile memory card, etc.), optical recording media (e.g., DVD, MO, MD, CD, BD, etc.), magnetic recording media (e.g., magnetic tape, flexible disk, etc.), and so forth. There also are cases where the functions of the above-described embodiments are realized not only by the loaded program being executed, but also where the functions of the present invention are realized by processing being performed collaboratively with an operating system, another application program, or the like, based on instruction of the program.

In a case of distributing to the market, the program may be stored in a portable recording medium and distributed, or may be transferred to a server computer connected via a network such as the Internet. In this case, a storage device in the server computer is included in the present invention. Part or all of the above-described base station device 1-1 and terminal devices 2-1 according to the above-described embodiments may typically be realized as an LSI that is an integrated circuit. The function blocks of the base station device 1-1 and terminal devices 2-1 may be formed as individual chips, or part or all may be formed as an integrated chip. In a case where the function blocks are formed as an integrated circuit, an integrated circuit control unit for control thereof is added.

Techniques for forming an integrated circuit are not restricted to LSIs, and may be realized by dedicated circuits or general-purpose processors. In the event of the advent of an integrated circuit technology which would replace LSIs by advance of semiconductor technology, integrated circuits according to such a technology may be used.

Note that the present invention is not restricted to the above-described embodiments. The base station device 1-1 and terminal devices 2-1 according to the present invention are not restricted to application to mobile station devices, and it is needless to say that this may be applied to fixed or non-portable electronic equipment installed outdoors or indoors, such as, for example, AV equipment, kitchen equipment, cleaning/laundry equipment, air conditioning equipment, office equipment, vending equipment, other daily-use equipment, and so forth.

Although embodiments of the present invention have been described in detail with reference to the drawings, specific configurations are not restricted to these embodiments, and designs and so forth that do not depart for the essence of this invention are also included in the scope of the Claims.

INDUSTRIAL APPLICABILITY

The present invention is suitable for use in a terminal device, communication method, and communication system.

The present application claims priority based on Japanese Patent Application No. 2015-090910 filed on Apr. 28, 2015, and the entirety of Japanese Patent Application No. 2015-090910 is incorporated in the present international application.

REFERENCE SIGNS LIST

1-1 base station device
2-1, 2a-1, 2b-1, 2c-1, 2d-1 terminal device
3-1 management range
10001-1 higher-layer unit
10002-1 autonomous decentralized control unit
10002a-1 CCA unit
10002b-1 back-off unit
10002c-1 transmission determination unit
10003-1 transmission unit
10003a-1 physical layer frame generating unit
10003b-1 wireless transmission unit
10004-1 reception unit
10004a-1 wireless reception unit
10004b-1 signal demodulation unit
10005-1 antenna unit
23-1, 23-2 range

The invention claimed is:

1. A station (STA) that performs uplink multiple access communication, the STA comprising:
   a reception unit configured to receive a trigger frame including uplink multiple access connection information;
   a first autonomous decentralized control unit configured to reduce a contention window (CW) after reception of the trigger frame including the uplink multiple access connection information; and
   a transmission unit configured to transmit a data frame based on a value of the CW,
   wherein:
   the trigger frame including the uplink multiple access connection information includes information of transmission permissible determination; and
   the trigger frame includes information associated with a long training field of the data frame.

2. An access point (AP) that solicits uplink multiple access communication, the AP comprising:
   a transmission unit configured to transmit a trigger frame including uplink multiple access connection information; and
   a reception unit configured to receive a data frame that is solicited by the trigger frame,
   wherein:
   the trigger frame includes information of transmission permissible determination;
   the information of transmission permissible determination solicits a first autonomous distributed control unit of a station (STA) receiving the trigger frame to reduce a contention window (CW); and
   the trigger frame includes information associated with a long training field of the data frame.

3. A method for performing uplink multiple access communication, the method comprising:
   receiving a trigger frame including uplink multiple access connection information;
   reducing a contention window (CW) after reception of the trigger frame including the uplink multiple access connection information; and
   transmitting a data frame based on a value of the CW,
   wherein:
   the trigger frame including the uplink multiple access connection information includes information of transmission permissible determination; and
   the trigger frame includes information associated with a long training field of the data frame.

* * * * *